Nov. 28, 1944.  D. E. WEAVER  2,363,632
THRESHING MACHINE
Filed Dec. 10, 1941   4 Sheets-Sheet 4
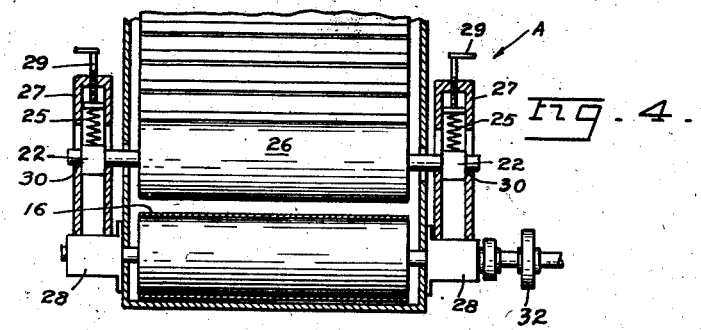
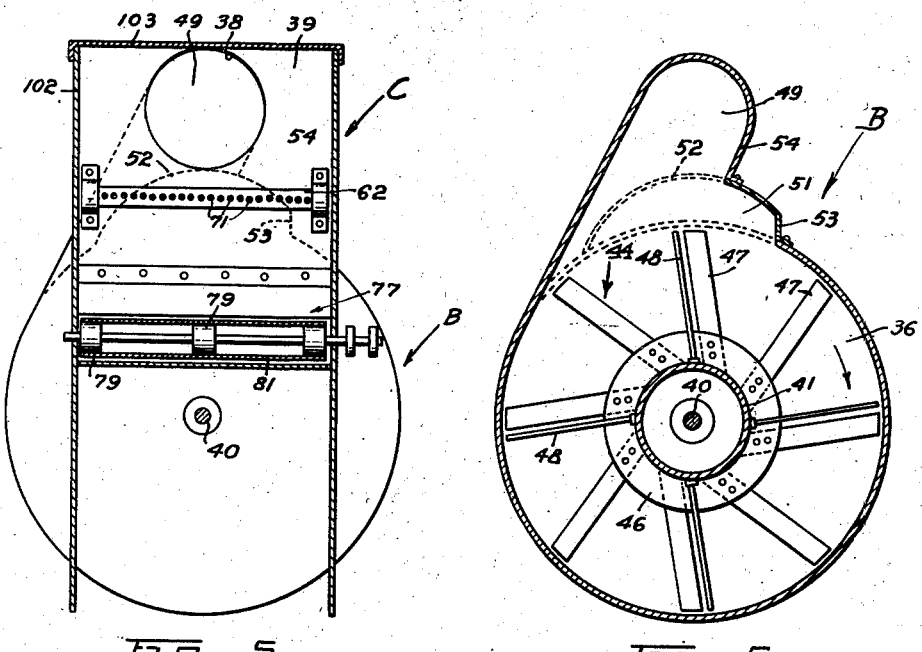
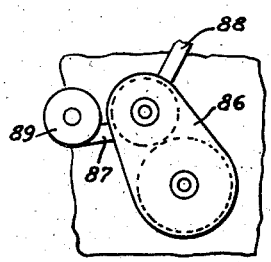
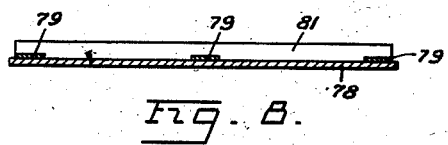
INVENTOR.
DOUGLAS E. WEAVER
BY George B. White
ATTORNEY Patented Nov. 28, 1944

2,363,632

UNITED STATES PATENT OFFICE 2,363,632

THRESHING MACHINE

Douglas E. Weaver, San Leandro, Calif.

Application December 10, 1941, Serial No. 422,340

10 Claims. (Cl. 130—27)

This invention relates to threshing machines and method.

Another object of this invention is to provide a threshing machine in which the grain or the like is automatically spread and distributed for uniform loading of the machine and treated in continuous action so that the apparatus feeds and operates without any danger of jamming or slugging.

Another object of this invention is to provide a threshing apparatus which can be used either as a portable unit or in a combine attached to any typical grain-header or the like, and which has such a load and feed distribution as to obviate the necessity of manual control or of the use of band cutters or the like, and in which the straw or chaff is reduced to easily dischargeable consistency, and the grain is thoroughly separated without so called tailings, and with minimum cracking or crushing.

Another object of this invention is to provide a threshing machine which can operate at full capacity without the necessity of being made level during the threshing operation; thus when used in a combine on hilly terrain the performance of the herein threshing machine is not affected by the contour of sloping ground.

Another object of this invention is to provide a threshing machine in which the wheat stalks or the like are efficiently fed and spread so as to be thoroughly loosened and the grain or seed freed therefrom without the grain or the like being cracked or crushed, and wherein the vibrating parts and mechanisms are reduced to a minimum yet are so effectively operated as to completely free, separate and clean the seed or grain by progressively increased vibration and by air turbulence and air currents and blasts in the same compact unitary apparatus.

Other objects of the invention together with the foregoing will be set forth in the following description of the preferred embodiment of means, which is illustrated in the drawings accompanying and forming part of the specification. It is to be understood that I do not limit myself to the illustrative embodiments disclosed in said description and the drawings as I may adopt variations of my preferred forms within the scope of my invention.

With the foregoing and other objects in view, which will be made manifest in the following detailed description, reference is had to the accompanying drawings for the illustrative embodiment Fig. 1 is a top plan view of my threshing machine, partly in section.

Fig. 4 is a fragmental view of the feed rollers of my machine.

Fig. 5 is a sectional view of the machine, the section being taken on the lines 5—5 of Fig. 2.

Fig. 6 is another sectional view of the machine the section being taken on the lines 6—6 of Fig. 2.

Fig. 7 is a detail view of the blower arrangement at the end of one of the screw conveyers; and Fig. 8 is a sectional detail of the support of the belt conveyers of the separator mechanism of the machine.

Figure 1:
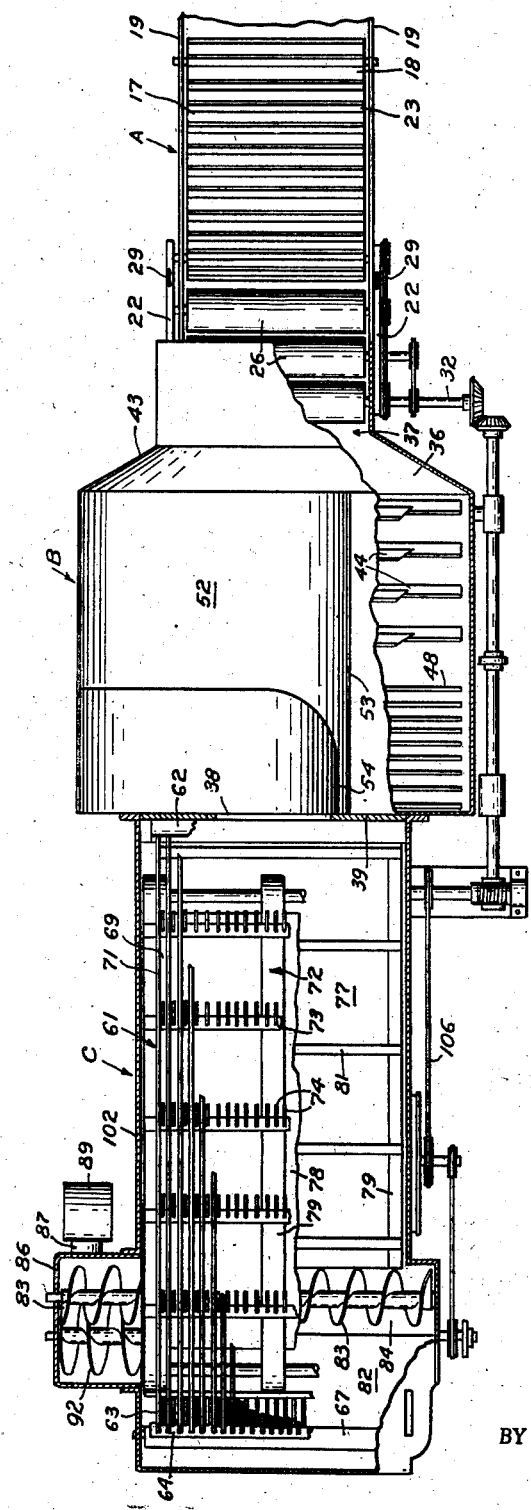

In the herein description frequently I will refer only to wheat as the material worked on, but it is to be understood that my method and apparatus are applicable to other materials, such as various small grain crops, seeds, or vegetables.

In my method of threshing the harvested wheat is fed and spread from a feeding point substantially radially and outwardly and then subjected simultaneously to beating action, to intermittent action of centrifugal force and of a partially directional air turbulence so that the wheat is repeatedly beaten and thrown and also driven directionally. In carrying out my method in detail, I feed the wheat, bundled or otherwise, so that the heads are subjected to flattening and loosening pressure. Then the partly loosened wheat is spread substantially circular fan wise and it is immediately acted upon by rotating flailers so that the wheat is driven outwardly from the point of feeding by the centrifugal force exerted by the rotating flailers and beaters. The wheat is repeatedly thrown off the outer peripheries of the flailer and beaters and dropped back again by gravity for further flailing. It is also subjected to air turbulence which is especially forceful at about the point where the wheat is thrown off the flailers and beaters. This air turbulence is at least partly directional so as to progressively advance the wheat to a series of beating and flailing action. The relative forces are such that the directional air turbulence overcomes the centrifugal force only to such a degree as to cause a resultant force of progressive and intermittent advancement, the advancement being by successive substantially similar steps from the intake toward the outlet of the flailing chamber.

machine includes a feeding mechanism A, a flailing mechanism B, and a separator C. The feeding mechanism A acts to slightly compress and flatten the bundles or mass of material containing the ears or heads of grain and to continually advance all the grain placed thereon to the flailing mechanism B. In the flailing mechanism the produce is spread out and then repeatedly flailed by rotating flailing blades and ejected and radially expelled by centrifugal force into a turbulence chamber several times and finally beaten by beating rods and ejected through an outlet into the separator C. In the separator C the grain is separated by a vibrating separator and rake and then it is carried through suitable air currents and fan blasts to be rid of dust and chaff. The cleaned grain is finally delivered to suitable conveyers or containers or the like.

The feeding mechanism A includes a belt conveyer 16 and a slatted belt conveyer 17 arranged at such angle that the respective belts converge at an acute angle in the direction of feeding. The first belt conveyer 16 is preferably horizontal and it rotates in a contra-clockwise direction viewing Fig. 2. The slatted belt conveyer 17 has one end played around a sprocket or pulley 18 so as to be suspended from a vertical bracket 19 at an incline in the direction of feeding. The lower end of the slatted conveyer 17 is played around a roller 21 which latter in turn is journaled in bearing brackets 22. The slatted conveyer 17 is driven in contra-clockwise direction viewing Fig. 2 so that the slats 23 thereof gather and force all loose grain onto the belt conveyer 16. A plurality of rollers 24 are provided under the belt conveyer 16 at the portion beyond the lower roller 21 of the slatted conveyer 17.

In the bearing brackets 22 are journaled a series of pressure rollers 26 opposite to and above the roller backed portion of the belt conveyer 16. There is a bearing bracket 22 on each side of the mechanism and at each end of the rollers 26. These bearing brackets 22 are slidable on frames 27 above fixed brackets 28, in which latter are journaled the ends of the lower small rollers 24. The opposite ends of the bearing brackets 22 are resiliently depressed by compression springs 25. The downward movement of the pressure rollers 26 is limited by stops 30 on the frames 27 so that the pressure rollers 26 are not allowed to touch the lower conveyer 16 and thereby prevent cracking or crushing the grain. The resilient pressure on the rollers 26 is regulated by adjusting rods 29 suitably threaded in the tops of the respective frames 27, as illustrated in Fig. 4 and by an enlarged head on the lower end of each rod 29 engaging the top of each spring 25. In this manner the resilient pressure on the rollers 26 is regulated so that the rollers 26 exert a desired pressure on the grain crop passed therethrough toward the flailing mechanism B. It is preferable that the ends of the bearing brackets 22 adjacent the slatted conveyer 17 be adjusted to allow more resiliency than at the ends nearer to the flailing mechanism B so that the space below the pressure rollers 26 is allowed to open wider where the wheat or the like is first passed to the pressure rollers 26 and the pressure gradually increases toward the inner end of the belt conveyer 16. A suitable deflector plate 31 extends from the vertical bracket 19 toward the belt conveyer 16 so that it tips any bundle or bunch that may be placed on the conveyer 16 in an upright position. Thus the bunches of wheat or the like are carried by the belt conveyer 16 to the pressure rollers 26 in horizontal position. The pressure rollers 26 are rotated in clockwise direction viewing Fig. 2 by suitable transmission indicated at 32 at Fig. 4.

In operation the bunches of wheat or the like are flattened out gradually by the pressure rollers 26. The force of this flattening of the bunches bursts the usual bands. The rolling pressure exerted on the heads of wheat also partly loosens the grain from the head. The inclined slatted conveyer 17 gathers the interlaced vines, straw, or matted materials that may be fed to the machine with the wheat, and forces them under the compressing rollers 26. Thus the need for manual feeding or for arranging by pitchfork is eliminated.

The flailing mechanism B has a flailing chamber 36, which has a substantially central intake 37 at one end and a substantially peripheral outlet 38 in the other end wall 39. In this flailing chamber 36 are arranged a plurality of flailing elements in consecutive groups. These flailing elements are mounted on a rotating drum which latter is suitably rotated by a shaft 40. On the end of the drum 41 adjacent the intake 37 is a spreader fan 42 which receives the grain from the central intake 37 and spreads the grain radially in all directions. To facilitate the advancement of the wheat longitudinally of the chamber 36, the intake end of the chamber 36 is formed by a substantially frusto-conical baffle wall 43, the apex of which is at the intake opening 37. Thus the wheat spread by the spreader fan 42 is bounced off the conical wall 43 and thereby acquires a directional momentum inwardly of the chamber 36.

The spreader fan 42 is followed by a group of spaced flailing wheels 44. Each flailing wheel 44 in this illustration is formed by a helical hub 46 mounted on the outer periphery of the drum 41. From this hub 46 extend flailing blades 47. Each blade 47 is pitched in such a manner that it urges the particles in the flailing chamber by the action of centrifugal force toward the outer periphery of the wheels 44 and also it creates air turbulence by its helical and rotary action. It is to be noted that the group of flailing wheels 44 are so located in the chamber 36 that the first wheel 44 is substantially in alignment with the base of the conical end wall 43.

Between the group of flailing wheels 44 and the outlet end wall 39 are arranged a series of beating elements, in the present illustration a plurality of rows of beating rods 48, which are mounted on the drum 41 in such a manner as to beat the particles fed to them and also to exert a centrifugal force upon the particles in that part of the chamber 36.

The chamber 36 is substantially cylindrical, as shown in Fig. 6, so that it surrounds the flailing wheels 44 and the beating rods 48 with a comparatively small peripheral clearance all around except at an open segment at the top. The drum 41 as well as the flailing elements thereon are rotated in a clockwise direction viewing Fig. 6. On the top of the chamber 36 opposite the beating rods 48 and adjacent the outlet 38 an outlet chamber 49 is provided over a part of said open top segment of the chamber 36. The outlet 38 as well as the outlet chamber 49 are outside of the radius of the cylindrical portion of the chamber 36. Also on the top of the chamber 36 and over said open top segment between the outlet chamber 49 and the conical inlet end 43 is provided a turbulence chamber 51. The housing 36 is so formed that the turbulence chamber 51 and the outlet chamber 49 are open to the inner space of the chamber 36. In other words, the outlet chamber 49 and the turbulence chamber 51 are parts of the flailing chamber 36, but they protrude at the top beyond the cylinder of the chamber 36. The turbulence chamber 51 is substantially opposite the group of flailing wheels 44 so that the centrifugal force expels the particles from the flailing blades into this turbulence chamber 51. The contour of this turbulence chamber 51 is such that it is arcuate at the top part 52, but a longitudinal wall 53 thereof in the direction of rotation adjacent the corner where it joins the cylindrical wall of the chamber 36 is straight and flat and provides an abutment wall against which the grain strikes when thrown by the helical flailing wheels 44. The grain expelled by the flailing blades may ride along the arcuate part 52 of the turbulence chamber 51 and then it strikes the abutment wall 53 with force and is thrown back in the path of the next flailing blade 47. The outlet chamber 49 is also substantially tangential to the periphery of the chamber 36 in the direction of rotation of the rods 48, and it has a substantially flat wall end 54 against which the particles hit when thrown by the centrifugal force of the beating elements.

The drum 41 which supports all the flailing and beating elements may be, in turn, supported in any suitable manner. In the herein illustration a bearing bracket 56 supports the drum 41 at a point between the spreader fan 42 and the first wheel 44. The other end of the drum 41 can be suitably journaled in the outlet wall 39. The shaft 40 may have a supporting sleeve 57 thereon which in turn can be suitably connected to the drum 41 so as to transmit rotation from the shaft 40 to the drum 41. In some instances where the unit is not too large for such support the flailing elements and the drum may be supported in cantilever fashion from the outlet end wall 39 and thus obviate any obstacle to the free flow and spread of the particles through the flailing chamber 36.

In operation the material, such as wheat, is fed from the feeding mechanism A centrally and at one end of the group of flailing and beating elements in the chamber 36. The spreading fan 42 spreads the material all around so that it beats against the conical end wall 43 and is bounced there along to the helical action of the flailing wheels 44. The blades 47 of the wheels 44 flail this material and when the particles reach the space opposite the turbulence chamber 51 they fly off the blades 47 and into said turbulence chamber 51. This centrifugal force carries the particles so that they beat against the flat wall 53 of the turbulence chamber 51 and from there by gravity bounce back into the chamber 36 so as to be engaged and flailed by the next flailing blade 47. This operation is repeated several times before the particles reach the end of the turbulence chamber 51 adjacent the beating rods 48. The spreading fan 42 as well as the helical wheels 44 create a directional air turbulence which continuously agitates the particles of material within the chamber 36 and which co-acts with the centrifugal force exerted by the flailing and beating elements to advance the material in intermittent steps through the chamber 36 toward the outlet end 39. The air turbulence is so baffled by the flailing elements and by the walls of the chamber that only part of the centrifugal force is overcome by the directional force of the air. In this manner the particles are allowed to drop back to the flailing blades 47 and to the beating rods 48 several times and advance progressively in the direction of the outlet end of the chamber 36. By reason of the helical hub 46 of each wheel 44 the flailing blades 47 are progressively offset axially of the chamber 36 with respect to each other so that the particles which bounce back from the turbulence chamber 51 engage the successive blades and thereby are progressively and gradually carried after each flailing another step toward the outlet end of the chamber 36. The beating rods 48 further beat the particles of material and throw the material centrifugally into the outlet chamber 49. The wall of the outlet chamber 49 opposite the outlet 38 is so curved that the particles of material bounced against it, with the assistance of the air current and the air turbulence, are bounced out through the outlet 38 to the other side of the outlet end wall 39 and to the separator mechanism C.

Figure 3:
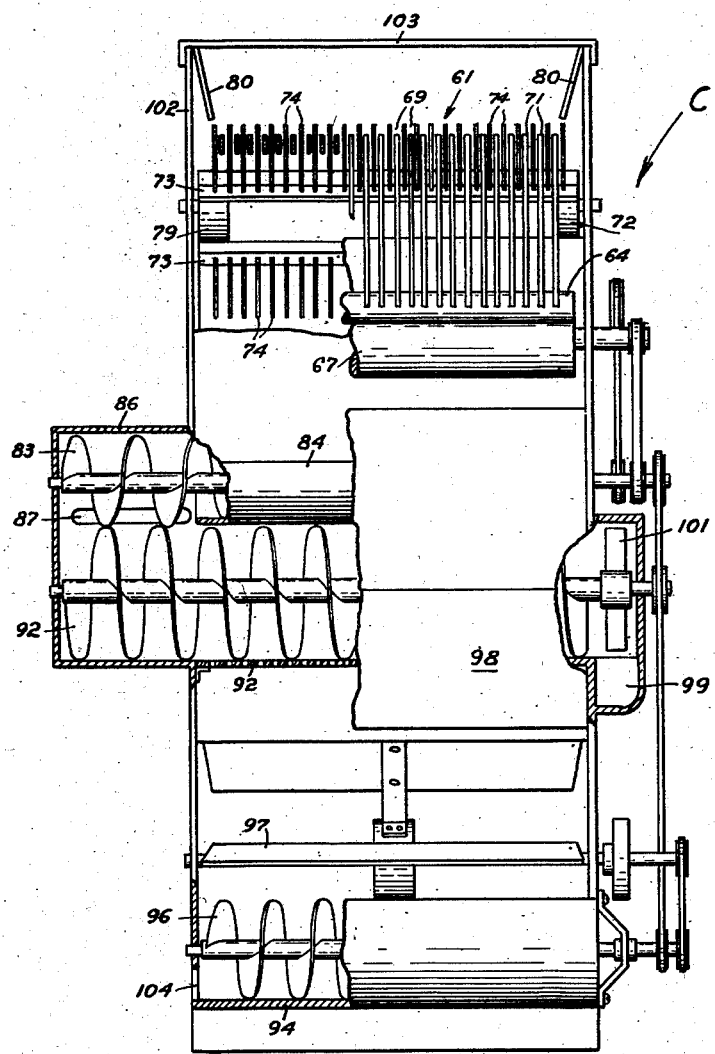
Fig. 3 is an end view of the threshing machine partly in section.

The separator mechanism C is divided in two groups, namely, the vibrator separator mechanism and the cleaning mechanism. The vibrator mechanism includes a vibrating grate 61 which is pivoted on a horizontal pivot 62 in suitable brackets on the chamber end wall 39. This grate 61 extends at an upward incline from its pivoted end 62 and it has a curved free end 63. A crossbar 64 on the free end of the grate 61 is held by a suitable spring 66 against a rotating eccentric cam 67 so that the rapid rotation of the cam 67 moves the free end of the grate 61 alternately up and down and thereby causes vibration the stroke of which is increased from the pivoted end toward the free end of the grate 61. A baffle 68 is positioned above the grate 61 and opposite the outlet 38 of the flailing chamber 36 so that the particles of material expelled through the outlet 38 are directed by the baffle 68 downwardly onto the grate 61. The portion of the grate 61 nearer its pivot has a vibration of lesser stroke than the portion of the grate 61 at its higher point at the top of the curved end 63. This in combination with the upward incline of the position of the grate 61 toward its curved free end 63 accomplishes a thorough separation of the grain or seed from the husk or head of the wheat or the like. The grate 61 is so formed that it has longitudinal slots or openings as shown in Figures 1 and 3. The grate 61 may be formed out of pressed metal or other suitable material, or it may be made of a plurality of grate bars 71 which are united by the pivot 62 and by the crossbar 64.

Figure 2:
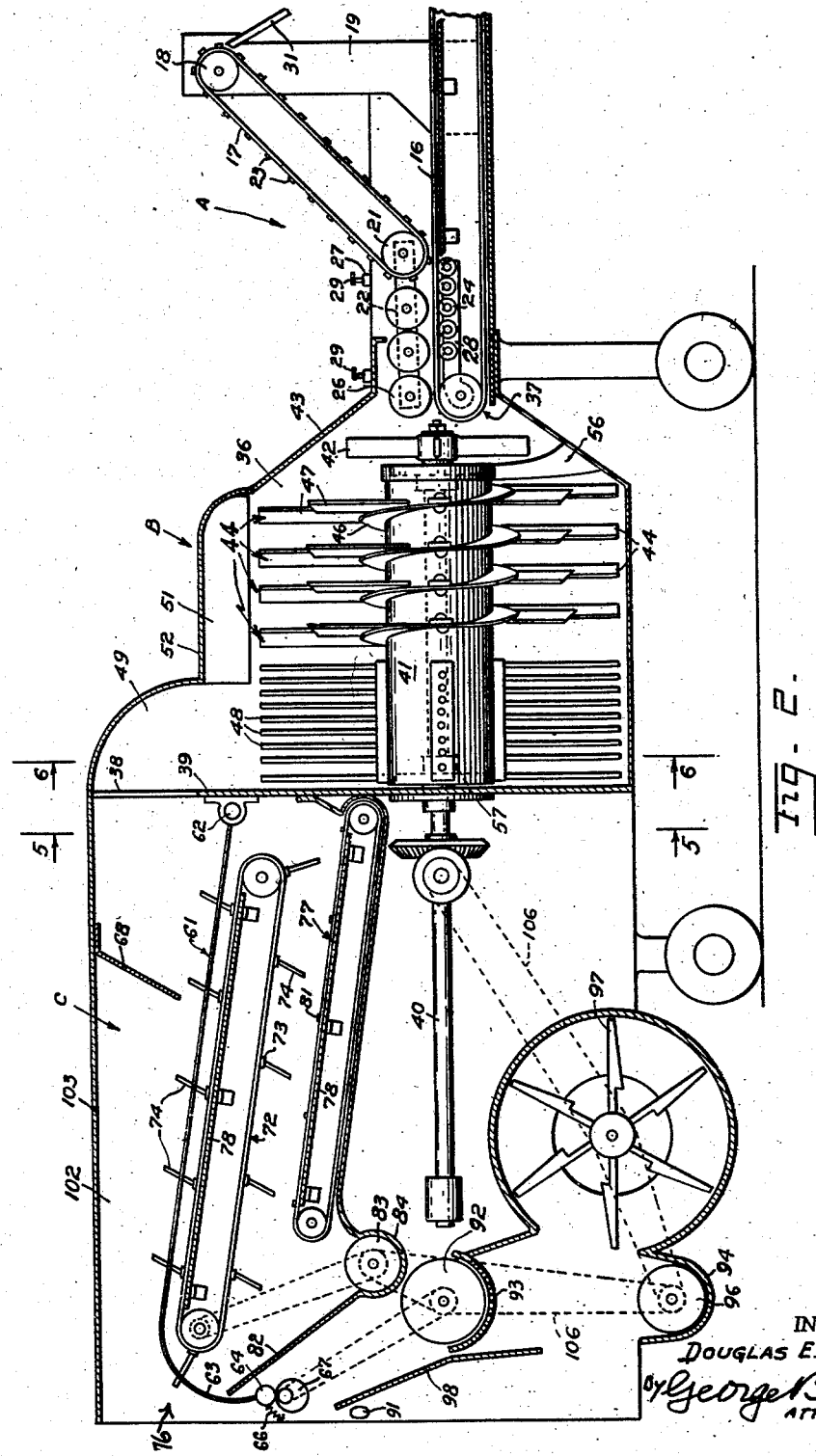
Fig. 2 is a partly sectional side view of my threshing machine.

The vibrating grate 61 is positioned above an endless conveyer 72 which is substantially parallel with the grate 61. This conveyer 72 has a plurality of cross slats 73 thereon from which extend a series of rakes 74. These rakes 74 are so spaced from each other and are of such dimensions that they move in the longitudinal slots or openings 69 of the vibrating grate 61. As it is shown in Fig. 2 the rakes 74 enter into the respective grate slots 69 near the pivoted end 62 of the grate and as the rakes 74 proceed along the length of the straight portion of the grate 61 they agitate and turn the coarse particles, such as chaff and straw, on the grate so as to separate the grain or seed and to sweep the coarse particles toward the higher end of the vibrating grate 61. This action combined with the vertical vibration of the grate efficiently separates the grain or seed from the chaff or straw or from other coarse particles. As the rakes 74 are carried around the outer turn of the endless conveyer 72 the coarse particles are cleared off the rakes 74 by the curved end 63 of the grate 61. This is accomplished by the eccentricity of the curved grate end 63 with respect to the outer turn of the endless conveyer 72 so that each rake 74 is gradually withdrawn at the turn from the curved end 63 of the grate 61 and is being cleared of all coarse particles so that the coarse particles are thrown off the grate 61 and out at the open end 76 of the threshing machine.

Inasmuch as some grain may fall through the grate 61 and into the space between the inner turn of the conveyer 72 and the end wall 39, I provide an additional endless conveyer 77 beneath and parallel with the first conveyer 72. This additional conveyer 77 extends from a point adjacent the end wall 39 to a point spaced from the outer turn of the first conveyer 72, and conveys the grain dropped from the pivoted end of the grate 61. Both conveyers 72 and 77 are constructed as shown in Fig. 8. A baseboard 78 extends below the upper branches of the belts 79 of each conveyer. These belts 79 are connected by transverse slats 81 which are slotted on the lower edges so that the belts 79 are sunk in or recessed into the bottom sides of each of said slats 81. Thus the bottom side or edge of each slat 81 rides in contact with the baseboard 78 and sweeps before it the grain or seed which fell onto the baseboard through the grate 61. The grain thus swept by the cross slats 81 is dropped at the outer ends of the baseboards 78 into a hopper 82 of the grain or seed cleaning mechanism of the machine. Sloping longitudinal baffle plates 80 extended from the top of the machine over the longitudinal edges of the conveyer confine the material to the grate surface and prevent waste over the sides of the grate.

The separated grain or seed is then cleared of dust and chaff by carrying it several times through suitable air currents. The hopper 82 feeds the separated grain to a screw conveyer 83 which advances the grain in its trough 84 into a housing 86 at one side of the machine, as shown in Figures 1 and 3. The bottom of the trough 84 is cut away at the portion inside the housing 86 so as to allow the grain to drop down by gravity to the bottom of the housing 86. At this point and aligned with the lower uncovered portion of the screw propeller 83 is an air intake 87 pointed partly upwardly against the direction of the grain movement in the screw propeller 83. Near the top of the housing 86, as shown in Fig. 7, is an exhaust conduit 88 also aligned with the portion of the screw conveyer within the housing 86. A suitable blower or fan indicated at 89 is provided for blowing an air blast through the portion of the screw conveyer 83 within the housing 86 so as to carry away chaff or dust from the grain. The exhaust conduit 88 may be connected to the outside or to the open exhaust end of the casing of the machine as indicated at 91 in Fig. 2.

As the grain falls down to the lower portion of the housing 87 it falls onto a second and larger screw conveyer 92. This larger screw conveyer 92 works oppositely to the smaller screw conveyer 83 so that it carries the partly cleaned grain from the housing 86 over a fine sieve or grate 93 which latter forms the bottom of the trough of the screw conveyer 92 outside of the housing 86. It is to be noted here that this sieve 93 is removable and replaceable so as to provide for various sizes and types of grain or seed. As the grain is thus conveyed, it drops through the sieve 93 and into the delivery trough 94 of a discharge screw conveyer 96 in the bottom of the machine. A suitable fan or blower 97 at one side of the space between the conveyers 92 and 96 is so arranged as to blow an air blast against the grain falling from the conveyer 92 and also through the sieve 93. The blow is of such strength as to allow the falling of the grain but clear it of dust and chaff. A suitable baffle plate 98 is provided along the outside of the screw conveyer 92 extending both above and below said large screw conveyer 92 so as to prevent the blowing of grain out of the machine, and also to facilitate the creation of air turbulence for the cleaning of the grain. It is to be also noted that the coarse material which does not fall through the sieve 93 is carried by the large screw conveyer 92 into a discharge chamber 99. A fan or blower 101 on the end of the screw conveyer 92 and inside of the discharge chamber 99 blows the coarse material, delivered there by the screw conveyer 92, out through the outlet of the discharge chamber 99. It is to be also noted that the conveyers 83 and 92 are rotated at different rates of speed, namely, the upper and smaller conveyer 83 is rotated faster, than the larger or lower conveyer 92.

The entire machine is surrounded by a casing with suitable side walls 102 and a top 103. The rear end of the machine is preferably open for the free discharge of dust and chaff and coarse material, but it may be provided with suitable baffles or collectors if so desired. The delivery trough 94 of the discharge screw conveyer 96 has an outlet port 104 through which the separated and cleaned grain can be delivered into suitable containers or onto another conveyer in any suitable manner, not shown.

The driving of the various mechanisms may be accomplished in any suitable manner. In the herein illustrations the dotted lines in Fig. 2 indicate transmission belts or chains 106 whereby rotation may be transmitted to the various blowers and fans and screw conveyers as well as to the eccentric 67 and to the conveyers 72 and 78. The shaft 42 driven as indicated in Fig. 2 operates the flailing mechanism. Similar transmission is connected to the pressure rollers and to the feeding conveyers at the intake end of the machine for operating the same.

The entire machine requires much less power than heretofore required by previous type threshing machines. The threshing machines and method herein described may be employed in a combine or it may be used in a portable unit separately. The contours of the ground do not influence the operation and durability of this machine. The machine is of unitary character. It has only one vibrating part; it cannot be jammed or slugged because it can feed and thresh at any rate of speed desired; it rapidly and thoroughly flails the materials introduced thereinto, but does so without cracking or crushing the grain or seed. The entire frame and the machine may be supported in any suitable manner, for instance in the form of a trailer on wheels, as shown in Fig. 2, or the machine may be mounted on a combine, as circumstances may demand. The method and machine herein described is efficient, simple, and compact; it rapidly and thoroughly flails material containing grain or seed and delivers the grain or seed thoroughly cleaned and dusted without the necessity of any manual operation or adjustment from the time the material is fed into the machine to the time of its delivery of the grain or seed therefrom.

I claim:

1. In a threshing mechanism, a flailing chamber closed all around its side, a series of rotating flailing and beating elements in said chamber, said chamber having an intake at one end thereof through which the material to be threshed is introduced substantially to a central portion of said rotating elements, and said chamber having an outlet at the other end thereof so related to the flailing and beating elements as to permit the ejection of the flailed material by the forces exerted by said flailing and beating elements, and a turbulence chamber formed at a side portion of the flailing chamber periphery and along several of said flailing elements so that said material is thrown into said turbulence chamber by the centrifugal force exerted by the rotating flailing elements, a longitudinal flailing wall in said tubulence chamber against which said material strikes and from which the material drops back to said flailing elements, the turbulence chamber being so formed that the air tubulence therein moves the material longitudinally of said chambers when thrown into the turbulence chamber, said longitudinal movement being at such rate as to permit the material to drop back to successive flailing members progressively upon repeated ejection into said turbulence chamber.

2. In a threshing mechanism, a flailing chamber closed all around its sides, a series of rotating flailing and beating elements in said chamber, said chamber having an intake at one end thereof through which the material to be threshed is introduced substantially to a central portion of said rotating elements, and said chamber having an outlet at the other end thereof so related to the flailing and beating elements as to permit the ejection of the flailed material by the forces exerted by said flailing and beating elements, a turbulence chamber formed at a side portion of the flailing chamber periphery and along several of said flailing elements so that said material is thrown into said tubulence chamber by the centrifugal force exerted by the rotating flailing elements, a longitudinal flailing wall in said turbulence chamber against which said material strikes and from which the material drops back to said flailing elements, the turbulence chamber being so formed that the air turbulence therein moves the material longitudinally of said chambers when thrown into the turbulence chamber, said longitudinal movement being at such rate as to permit the material to drop back to successive flailing members progressively upon repeated ejection into said turbulence chamber, and an outlet chamber formed peripherally in said flailing chamber and substantially in continuation of said turbulence chamber and arranged at such angle with respect to the outlet as to permit the ejection of the flailed material by the forces exerted on said material by the flailing and beating elements in throwing said material into said outlet chamber.

3. In a threshing machine, a flailing chamber, and a series of flailing wheels arranged in a series longitudinal in the chamber and rotating substantially transversely of the chamber, said chamber having an inlet at one end thereof so as to feed axially toward the central portion of the wheels, and having an outlet near the periphery at the other end thereof, and having a longitudinal chamber along one side thereof, and a striking edge at said longitudinal chamber adjacent the peripheries of said flailing wheels, said outlet being contiguous with the end of said longitudinal striking chamber.

4. In a threshing machine, a flailing chamber, a turbulence chamber arranged longitudinally over a portion of the periphery of the flailing chamber, and an outlet chamber arranged substantially in continuation of said turbulence chamber, an inlet at the end of the flailing chamber nearer to said turbulence chamber so arranged as to feed substantially toward the central portion of the flailing chamber, rotating, flailing and beating means in said flailing chamber rotating around an axis substantially longitudinal to said flailing chamber so as to expell by centrifugal force flailed material into said turbulence chamber, a flailing wall in said turbulence chamber against which the expelled material strikes, said turbulence chamber being so formed that the material expelled thereinto is progressively advanced in the direction of said outlet chamber at such rate as to repeatedly return to said flailing means before it reaches the outlet chamber, an outlet leading from said outlet chamber, said outlet and said outlet chamber being so formed that the material expelled from the flailing and beating means into said outlet chamber is ejected through said outlet from the outlet chamber.

5. In a threshing machine, a flailing chamber, a substantially frusto conical intake end of said chamber flaring from the center of the chamber end toward the chamber periphery and having an intake opening at about the apex of said end, means to feed the grain through said intake opening, a spreader element in the chamber opposite said opening to spread and throw the grain against the inclined walls of said frusto conical end so as to bounce the spread grain back toward the center of the chamber, and a plurality of flailing elements in said chamber rotating substantially around the axis of said chamber so as to flail the grain and intermittently advance it toward the other end of the chamber, said chamber having an outlet at said second end.

6. In a threshing machine, a flailing chamber, a substantially frusto conical intake end of said chamber flaring from the center of the chamber end toward the chamber periphery and having an intake opening at about the apex of said end, opposed pressure feed elements opposite said intake opening for flatly spreading the bundles of grain under pressure and feeding the grain into said opening, a spreader element in the chamber opposite said opening to spread and throw the grain against the inclined walls of said frusto conical end so as to bounce the spread grain back toward the center of the chamber, and a plurality of flailing elements in said chamber rotating substantially around the axis of said chamber so as to flail the grain and intermittently advance it toward the other end of the chamber, said chamber having an outlet at said second end.

7. In a threshing machine, a flailing chamber, a substantially frusto conical intake end of said chamber flaring from the center of the chamber end toward the chamber periphery and having an intake opening at about the apex of said end, means to feed the grain through said intake opening, a spreader element in the chamber opposite said opening to spread and throw the grain against the inclined walls of said frusto conical end so as to bounce the spread grain back toward the center of the chamber, and a plurality of flailing elements in said chamber rotating substantially around the axis of said chamber so as to flail the grain and intermittently advance it toward the other end of the chamber, said chamber having an outlet at said second end, said chamber having a turbulence chamber substantially longitudinal along the one side of the flailing element extending from the base of said frusto conical end toward said outlet, and a striking wall forming a wall of said turbulence chamber at right angles to and facing the direction of rotation of said flailing element to bounce the grain from said turbulence chamber toward the center of said chamber and to the successive flailing elements.

8. In a threshing machine, a flailing chamber, a substantially frusto conical intake end of said chamber flaring from the center of the chamber end toward the chamber periphery and having an intake opening at about the apex of said end, means to feed the grain through said intake opening, a spreader element in the chamber opposite said opening to spread and throw the grain against the inclined walls of said frusto conical end so as to bounce the spread grain back toward the center of the chamber, and a plurality of flailing elements in said chamber rotating substantially around the axis of said chamber so as to flail the grain and intermittently advance it toward the other end of the chamber, said chamber having an outlet at said second end, said chamber having a turbulence chamber substantially longitudinal along one side of the flailing element extending from the base of said frusto conical end toward said outlet, and a striking wall forming a wall of said turbulence chamber at right angles to and facing the direction of rotation of said flailing elements to bounce the grain from said turbulence chamber toward the center of said chamber and to the successive flailing elements, the end of said turbulence chamber farthest from said intake end being enlarged outwardly of the chamber to form an outlet chamber, said outlet chamber being so curved as to direct the grain thrown into it out of said chamber in a direction substantially parallel with the axis of said chamber.

9. In a threshing machine, a flailing chamber, an end of the chamber being formed by inclined walls flaring toward the chamber periphery so as to bounce the material toward the center of the chamber, said end of the chamber having an intake therein at about the apex of said end, the other end of the chamber having an outlet arranged offset outwardly from the chamber periphery, an outlet chamber formed opposite said outlet so as to direct material expelled into the outlet chamber out through said outlet, a turbulence chamber extended longitudinally between the outlet chamber and said inclined end, rotating flailing means in said chamber so located as to receive the material from said inclined end and repeatedly to throw the material into said turbulence chamber, means in said turbulence chamber against which the material strikes when thrown by the flailing means and which returns the material to said flailing means, and beating elements rotating with the flailing means opposite said outlet chamber to beat the flailed material and expell it centrifugally through said outlet chamber.

10. In a threshing machine, a flailing chamber, and a series of rotating flailing wheels in the chamber, each flailing wheel comprising a pitched hub, a plurality of pitched flailing blades extended from the hub, means to feed the material to be threshed into said chamber substantially at right angles to the plane of rotation of said flailing wheels and opposite the hubs of said wheels, a spreader element between the first wheel of the series and the feeding means to circumferentially spread the material radially and inward of the chamber, and means to bounce the material spread by said element toward the hubs of the wheels.

DOUGLAS E. WEAVER.